(12) United States Patent
Miyasato et al.

(10) Patent No.: US 9,740,840 B2
(45) Date of Patent: Aug. 22, 2017

(54) USER AUTHENTICATION USING VOICE AND IMAGE DATA

(71) Applicant: Empire Technology Development LLC, Wilmington, DE (US)

(72) Inventors: Tsutomu Miyasato, Nara (JP); Noriaki Kuwahara, Katsuragi-gun (JP); Rieko Kadobayashi, Kizugawa (JP); Masataka Ohira, Saitama (JP); Noriaki Mitsunaga, Yao (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/771,873

(22) PCT Filed: Jan. 27, 2014

(86) PCT No.: PCT/US2014/013149
§ 371 (c)(1),
(2) Date: Sep. 1, 2015

(87) PCT Pub. No.: WO2015/112175
PCT Pub. Date: Jul. 30, 2015

(65) Prior Publication Data
US 2016/0019380 A1    Jan. 21, 2016

(51) Int. Cl.
*G06F 7/04* (2006.01)
*G06F 15/16* (2006.01)
(Continued)

(52) U.S. Cl.
CPC ........ *G06F 21/32* (2013.01); *G06F 17/30268* (2013.01); *G06F 17/30289* (2013.01);
(Continued)

(58) Field of Classification Search
CPC ............... G06F 21/32; G06F 17/30268; G06F 17/30752; G06F 21/31; G06F 7/04;
(Continued)

(56) References Cited

U.S. PATENT DOCUMENTS

| 7,278,028 B1 * | 10/2007 | Hingoranee | G06F 21/32 713/161 |
| 7,925,887 B2 * | 4/2011 | Burton | G06F 21/32 340/5.82 |

(Continued)

FOREIGN PATENT DOCUMENTS

| JP | 2006157914 A | 6/2006 |
| JP | 2007133754 A | 5/2007 |

(Continued)

OTHER PUBLICATIONS

"CAPTCHA," accessed at https://web.archive.org/web/20140122002848/http://en.wikipedia.org/wiki/CAPTCHA, last modified on Jan. 20, 2014, pp. 9.

(Continued)

*Primary Examiner* — Jayesh Jhaveri
(74) *Attorney, Agent, or Firm* — Brundidge & Stanger, P.C.

(57) ABSTRACT

Techniques are generally described for user authentication. Example techniques may include providing a data set including audio data and image data, wherein the audio data includes voice recordings of multiple people, wherein the image data includes at least a facial image of at least one of the multiple people, receiving a response to the data set from a user device, and determining whether the received response corresponds to at least a part of content of the voice recording of the one of the multiple people whose facial image is included in the image data.

22 Claims, 7 Drawing Sheets

(51) Int. Cl.
   *G06F 17/30*    (2006.01)
   *H04L 29/06*    (2006.01)
   *G06F 21/32*    (2013.01)
   *G06K 9/00*     (2006.01)
   *G06F 21/31*    (2013.01)
   *H04L 9/32*     (2006.01)
   *G10L 17/24*    (2013.01)

(52) U.S. Cl.
   CPC ... *G06F 17/30752* (2013.01); *G06K 9/00885* (2013.01); *H04L 63/0861* (2013.01); *G06F 21/31* (2013.01); *G10L 17/24* (2013.01); *H04L 9/3226* (2013.01); *H04L 9/3231* (2013.01)

(58) Field of Classification Search
   CPC ..... G06F 15/16; G06F 17/30; H04L 63/0861; H04L 9/3226; H04L 9/3231; H04L 29/06
   See application file for complete search history.

(56) References Cited

U.S. PATENT DOCUMENTS

| | | | |
|---|---|---|---|
| 7,945,952 | B1 | 5/2011 | Behforooz |
| 8,037,310 | B2 | 10/2011 | Wolff |
| 8,925,058 | B1* | 12/2014 | Dotan ................. H04L 63/0861 713/186 |
| 2006/0120577 | A1* | 6/2006 | Shinzaki ................. G06F 21/32 382/124 |
| 2007/0043766 | A1 | 2/2007 | Nicholas et al. |
| 2009/0232351 | A1 | 9/2009 | Kagitani et al. |
| 2010/0115114 | A1* | 5/2010 | Headley ................. G06F 21/32 709/229 |
| 2011/0029902 | A1 | 2/2011 | Bailey |
| 2011/0225629 | A1 | 9/2011 | Pai |
| 2012/0004914 | A1 | 1/2012 | Strom et al. |
| 2013/0036462 | A1* | 2/2013 | Krishnamurthi ........ G06F 21/32 726/19 |
| 2013/0047232 | A1* | 2/2013 | Tuchman .............. H04L 9/3226 726/7 |
| 2013/0061318 | A1 | 3/2013 | Shirai et al. |
| 2013/0124292 | A1* | 5/2013 | Juthani ................... G06F 21/41 705/14.26 |
| 2013/0227651 | A1* | 8/2013 | Schultz ................... G06F 21/32 726/4 |
| 2013/0267204 | A1* | 10/2013 | Schultz ................... G06F 21/32 455/411 |
| 2014/0283022 | A1* | 9/2014 | Beloncik ................. G06F 21/32 726/19 |
| 2015/0154387 | A1* | 6/2015 | Cockcroft ............... G06F 21/36 726/6 |
| 2015/0235017 | A1* | 8/2015 | Oberheide .............. G06F 21/32 726/6 |

FOREIGN PATENT DOCUMENTS

| | | |
|---|---|---|
| JP | 2009266067 A | 11/2009 |
| JP | 2010067096 A | 3/2010 |
| JP | 2011013973 A | 1/2011 |
| JP | 2011118635 A | 6/2011 |

OTHER PUBLICATIONS

Chaturvedi, R., "Audio CAPTCHA[report]," accessed at https://web.archive.org/web/20121231041042/http://www.scribd.com/doc/51989038/Audio-CAPTCHA-report, Mar. 31, 2011, pp. 10.

International Search Report and Written Opinion for international application No. PCT/US14/13149, mailed on Jun. 10, 2014.

Martin, A. F., and Przybocki, M. A., "Speaker Recognition in a Multi-Speaker Environment," Interspeech, pp. 1-4 (2001).

Tam, J., et al., "Breaking Audio CAPTCHAs," In Conference of Advances in Neural Information Processing Systems, pp. 1625-1632 (2008).

* cited by examiner

USER AUTHENTICATION USING VOICE AND IMAGE DATA

CROSS-REFERENCE TO RELATED APPLICATION

This Application is the U.S. National Stage filing under 35 U.S.C §371 of PCT Application Ser. No. PCT/US2014/13149 filed on Jan. 27, 2014. The disclosure of the PCT Application is hereby incorporated herein by reference in its entirety.

BACKGROUND

User authentication data, including personal or other types of confidential data, provides secure access to Internet services. Computer-based brute-force attacks or dictionary attacks for stealing personal or confidential information have become a problem in Internet services.

Unless otherwise indicated herein, the materials described in this section are not prior art to the claims in this application and are not admitted to be prior art by inclusion in this section.

SUMMARY

The present disclosure describes a method performed under control of a computer device. Some example methods may include generating a data set including audio data and image data, wherein the audio data includes voice recordings corresponding to multiple people, wherein the image data includes at least a facial image of at least one of the multiple people, and wherein the audio data includes at least a voice recording of the one of the multiple people whose facial image is included in the image data; receiving a response to the data set from a user device; and determining whether the received response corresponds to at least a part of content of the voice recording of the one of the multiple people whose facial image is included in the image data.

The present disclosure further describes a computer device. Some example computer devices include a data set generating unit and an authentication unit. The data set generating unit may be configured to generate a data set including audio data and image data, wherein the audio data includes voice recordings corresponding to multiple people, wherein the image data includes a facial image of at least one of the multiple people, and wherein the audio data includes at least a voice recording of the one of the multiple people whose facial image is included in the image data. The authentication unit may be configured to receive a response to the data set from a user device, and to determine whether the received response corresponds to at least a part of content of the voice recording of the one of the multiple people whose facial image is included in the image data.

The present disclosure further describes a computer readable storage medium. Some example computer readable storage medium have contents that, when executed by a computer device, may cause a computer to generate a data set that includes audio data and image data, wherein the audio data include voice recordings corresponding to multiple people, wherein the image data includes a facial image of at least one of the multiple people, and wherein the audio data includes at least a voice recording of the one of the multiple people whose facial image is included in the image data; receive a response to the data set from a user device; and determine whether the received response corresponds to a part of content of the voice recording of the one of the multiple people whose facial image is included in the image data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to user authentication based on voice data and/or image data.

In some example embodiments, a method performed under control of a computer device may include generating a data set including audio data and image data, wherein audio data includes voice recordings corresponding to multiple people, wherein the image data includes at least a facial image of at least one of multiple people, and wherein the audio data includes at least a voice recording of the one of the multiple people whose facial image is included in the audio data, receiving a response to the data set from a user device, and determining whether the received response corresponds to at least a part of content of the voice recording of the one of the multiple people whose facial image is included in the image data.

The data set may include audio and image data corresponding to a person who is known by an authenticating user. The audio data may include voice recordings or files of multiple people, so that the user may hear the audio data including mixed voice recording data in case of user authentication. However, if a person requests to be authenticated by a user device, the person is able to recognize a known person's voice recording corresponding to at least facial image of the known person designated by an authenticating computer device or selected by the user. This is called cocktail party effect.

Figure 1:
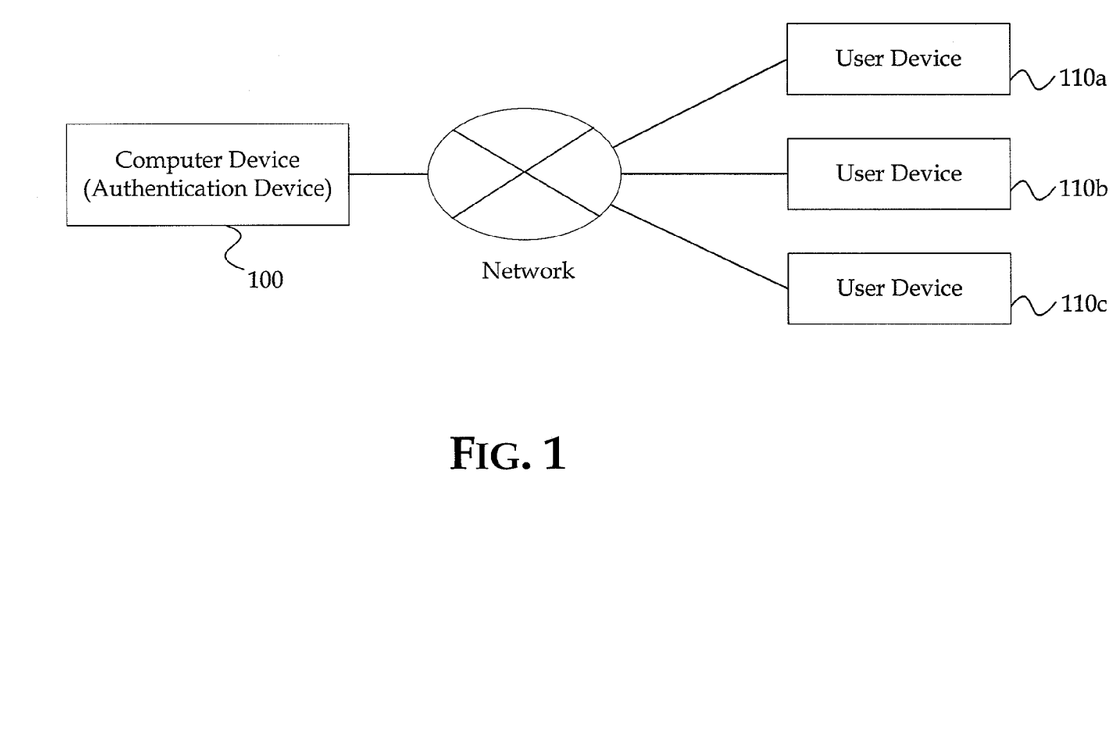
FIG. 1 is a block diagram illustrating an example system to authenticate user.

FIG. 1 is a block diagram illustrating an example system to authenticate a user arranged in accordance with at least some embodiments of the present disclosure. An example system may include computer device 100 and user devices 110a, 110b, and 110c. Unless context otherwise requires particular mention or description of one of such devices, user devices 110a, 110b, and 110c may be collectively referenced as "user devices 110." Further, although the current depiction includes only three such user devices, the example embodiments are not so limited in quantity. Regardless, computer device 100 may connect to user devices 110 via a communication network, such as the Internet, LAN, Wi-Fi, wireless network, or any other communication network.

Computer device 100 may be configured to generate a data set that includes audio data that includes at least one recording or file of voices for multiple people and image data that includes a facial image of at least one of the aforementioned multiple people. The generated audio data and image data may be sent to one of user devices 110 to be used for user authentication.

Computer device 100 may be further configured to authenticate a user by determining whether a voice included in a response or request from one of user devices 110 corresponds to at least a portion of the audio data corresponding to a person whose facial image is included in the image data. In another example, computer device 100 may be further configured to authenticate a user by determining whether a text included in a response or request from one of user devices 110 matches with at least a portion of the audio data corresponding to the facial image of the person stored in the image data.

In one example embodiment, computer device 100 authenticates a user to allow to access personal or confidential information in an online service in accordance with a request from an online service provider. In another example, computer device 100 is an authentication apparatus in a service provider system.

User devices 110 may be configured to receive a data set including audio data and image data from computer device 100, to display and reproduce the data set including the audio and the image data, to input a response of text data or audio data, and to transmit the response to computer device 100. Examples of user devices 110 may be included, but not limited to, a mobile phone, a smart phone, a personal digital assistant (PDA), a laptop computer, a notebook computer, or any other similar devices including communication capability, a display, and a sound reproduction unit.

Figure 2:
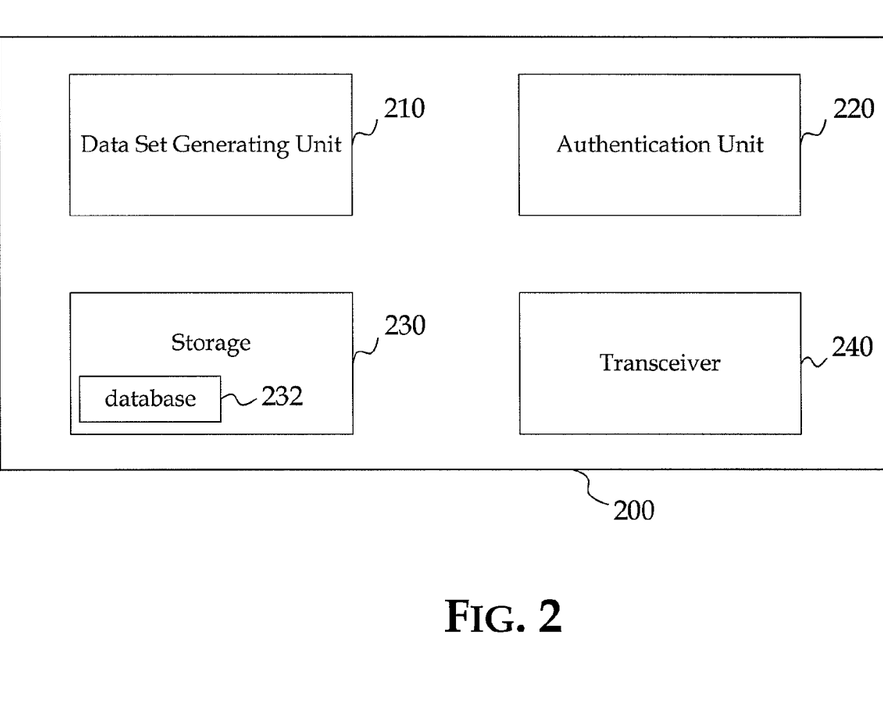
FIG. 2 is a block diagram illustrating an example computer device.

FIG. 2 is a block diagram illustrating an example computer device 200 configured in accordance with at least some embodiments described herein. As depicted, computer device 200 may include data set generating unit 210, authentication unit 220, storage 230, and transceiver 240. Although illustrated as discrete components, various components may be divided into additional components, combined into fewer components, or eliminated, depending on the desired implementation.

Data set generating unit 210 may be configured to generate a data set including audio data and image data to be transmitted to one of user devices 110. In some embodiments, the data set may include audio data including voice recordings corresponding to multiple people and image data including at least a facial image of one or more of the multiple people.

By way of example, but not limitation, data set generating unit 210 may generate the data set by combining one or more input or currently stored video data. In another example, data set generating unit 210 may generate the data set through combining image data and audio data. The data set may include at least audio data including voice recordings corresponding to multiple people and/or image data including a facial image of one or more of the multiple people.

Audio data, as referenced herein, can be utilized in many forms, including voice recordings of multiple people, such as analog audio data, WAV format data, MPEG format data, or any other formatted audio data. Image data, as referenced herein, can be utilized in many forms that includes a facial image of at least one person, such as video images, still images extracted from video, digital images, or any other formatted image data. The data set can be one or plural video data, or a combination of picture and audio data.

In one embodiment, data set generating unit 210 may request that at least one of multiple people shown in the image data input a voice recording to one of user devices 110. In some example embodiments, data generating unit 210 may generate a data set by obtaining audio data and image data stored in database 232 in storage 230. In some embodiments, data set generating unit 210 may request that a response to the request, including at least a portion of the voice recording of the person shown in the image data be stored in database 232. In one embodiment, data set generating unit 210 may generate another data set when a data set change is requested by one of user devices 110.

Authentication unit 220 may be configured to receive a response to the data set from one of user devices 110 via transceiver 240, and determine whether the received response corresponds to at least a part of content of the voice recording of the one or more persons whose facial image is included in the image data. In one embodiment, authentication unit 220 may accept a selection of one person in the image data of the data set from one of user devices 110. In some embodiments, authentication unit 220 may be configured to retrieve content of the voice recording corresponding to the person in image data from storage 230, compare the response with retrieved content, and determine whether the response corresponds to at least a part of the retrieved content.

Storage 230 may be configured to store audio data and image data, and/or video data. In one embodiment, storage 230 may include database 232, in which audio data, image data, and/or video data may be stored. In one example, database 232 may store at least a voice recording of one or more people. Another example, database 232 may store image data including at least a facial image of one or more of the people for whom a voice recording may also be stored in database 232. In this embodiment, storage 230 is located at a computer device 200. However, in another example, storage 230 can be located outside of the computer device 200.

Transceiver 240 may be configured to transmit data to one of user devices 110 and receive data from one of user devices 110. The transmitted and/or received data may include, without limitation, a data set including audio data and image data, a response to the data set, a data change request, or data of a selection of one person in image data. For example, transceiver 240 may transmit the data set including audio data and image data to one of user devices 110. In another example, transceiver 240 may receive a response to the data set from the one of user devices 110. In one embodiment, transceiver 240 may receive a data change request from one of user devices 110 when a user attempts to use another data set at another one of user devices 110. Further, transceiver 240 may send another data set in accordance with the data change request from one of user devices 110. In another embodiment, transceiver 240 may receive data including a selection of a person included in stored image data when one of the user devices 110 designates that person.

Figure 3:
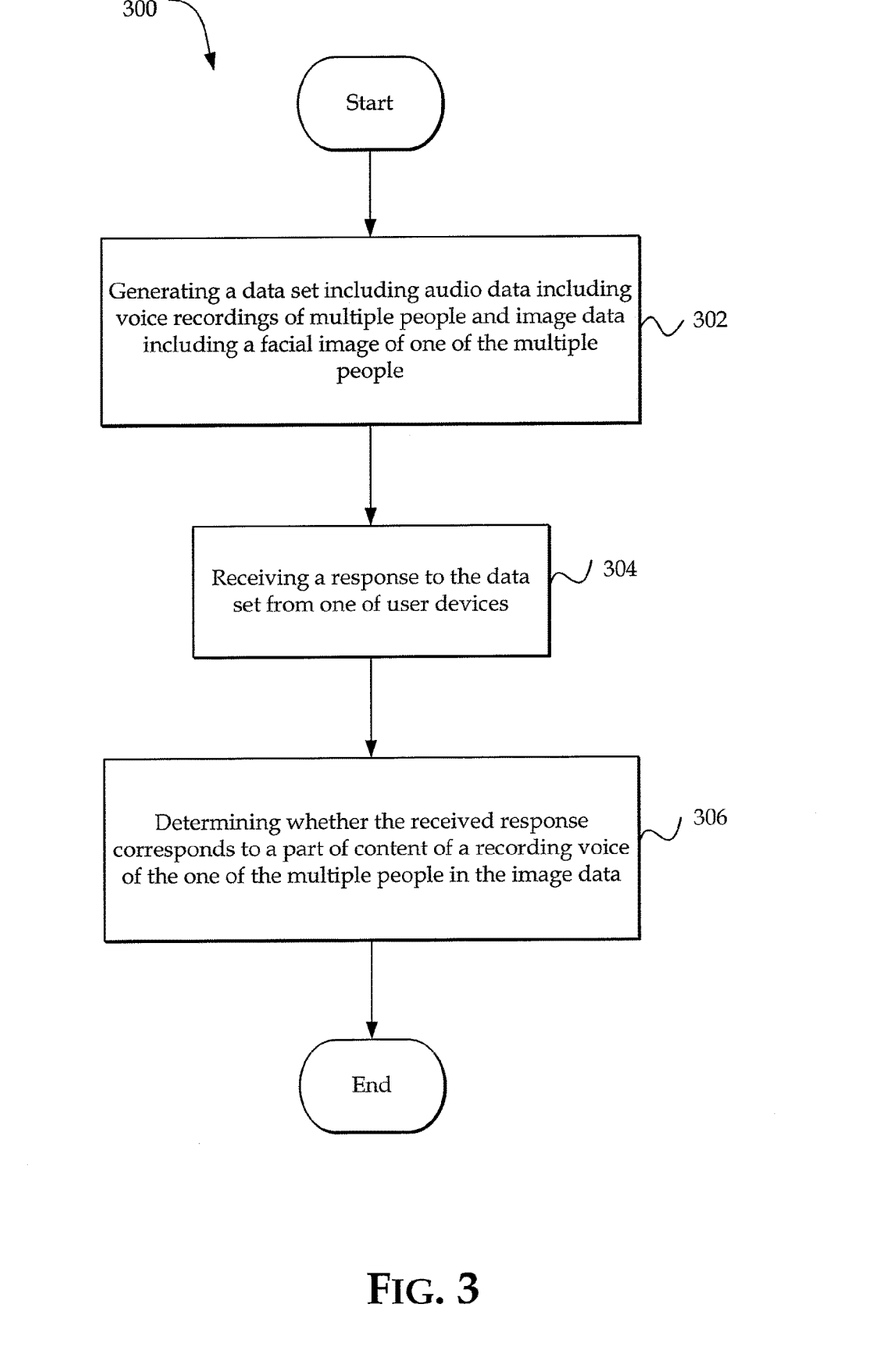
FIG. 3 is a flowchart depicting an example method of user authentication.

FIG. 3 is a flowchart depicting an example method 300 of user authentication configured in accordance with at least some embodiments described herein. Example method 300 may include one or more operations, functions, or actions as illustrated by blocks 302 through 308. Although illustrated as discrete blocks 302 through 306, the various blocks are illustrative partitions in an example method. The example method 300 may be implemented in computer device 100 or 200. The example method 300 may begin at block 302, which may include generating a data set including audio data including voice recordings corresponding to multiple people, and image data including a facial image of one of the multiple people.

Block 302 may refer to computer device 100 generating a data set including audio data that includes voice recordings corresponding to multiple people, and also generate image data that includes a facial image of one or more of the multiple people. In some embodiments, the data set may include audio data including voice recordings of multiple people and image data including at least a facial image of one of the multiple people. In one embodiment, generating a data set may be performed by combining image data and audio data. At least one person's voice recording in the audio data may correspond to one person's facial image in the combined image data. In one example, the audio data including voice recordings of multiple people is monaural. In another example, the image data may include at least one picture. In another embodiment, generating a data set may be performed by combining one or more video data. The video data may include at least one person speaking.

In one example, the image data includes multiple people and one of multiple people in the image data may be designated by computer device 100. Computer device 100 may send a data set including audio data and image data of a designated person. In another example, the data set including audio data and image data, including facial images of multiple people, may be transmitted to one of user devices 110. The one of user devices 110 to which the data set is transmitted may select one of the multiple people whose facial image appears in image data to computer device 100. Computer device 100 may accept the selection of the one person from the image data by the one of user devices 110. Computer device 100 may request that the selected person input a response including at least part of a voice recording.

In another embodiment, computer device 100 may request that another person whose facial image is shown in the image data input at least a part of a voice recording. The example method may flow from block 302 to block 304.

Block 304 may refer to computer device 100 receiving a response to the data set from one of user devices 110. Computer device 100 may receive the response by transceiver 240. By way of example, but not limitation, the response may include text data which indicates a part of content of a voice recording of a designated or selected person shown in the image data. A user of one of user devices 110 may be able to distinguish the selected or designated person's voice in multiple people's voice data by cocktail party effect. The example method may flow from block 304 to block 306.

Block 306 may refer to computer device 100 determining whether the received response corresponds to at least part of a voice recording of one of the multiple people whose facial image is shown in and stored with regard to the image data. In some embodiments, computer device 100 may authenticate one of user devices 110 when the received response from one of user devices 110 includes at least the same part of the voice recording of the person shown in the image data. In one embodiment, when one of multiple people in the image data is designated by computer device 100, computer device 100 may determine whether the response corresponds to at least a part of a voice recording of the designated person shown in the image data. In another embodiment, when one of the persons shown in the image data is selected by one of user devices 110, computer device 100 may determine whether the received response from one of the user devices 110 corresponds to at least a part of the voice recording of the selected person in the image data.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
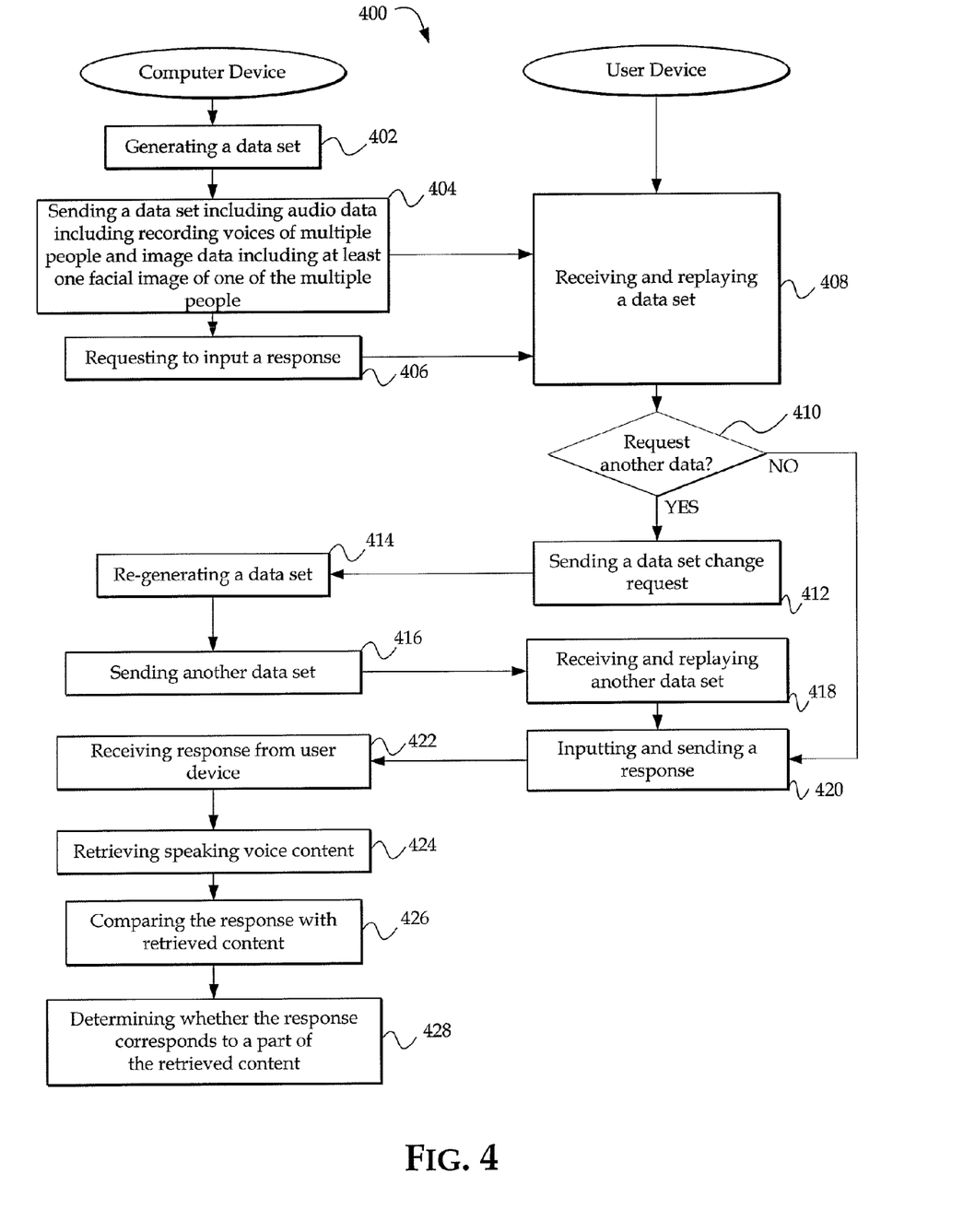
FIG. 4 is a flowchart depicting another example method of user authentication.

FIG. 4 is a flowchart depicting another example method of user authentication that is configured in accordance with at least some embodiments of the present disclosure. Example methods 400 may include one or more operations, functions, or actions as illustrated by blocks 402 through 428. The example method 400 may provide one or more examples of implementations of method 300 of FIG. 3.

Method 400 may be implemented in an example system shown in FIG. 1. Computer device 100 which is an authentication device may be connected with user devices 110 via a communication network. The example method 400 may begin at block 402 (Generating a Data Set), which may refer to computer device 100, and data set generating unit 210 in some embodiments, generating a data set for user authentication. In one embodiment, computer device 100 may generate a data set based on a request of a service provider. In some embodiments, computer device 100 may generate a data set including audio data that includes voice recordings of multiple people and image data that includes at least one facial image of one of the multiple people. In one embodiment, computer device 100 may generate a data set by retrieving audio data and image data from database 232 corresponding to storage 230. In another embodiment, computer device 100 may generate plural data sets of which one data set may be selected by one of user devices 110. A data set may include video data that includes voice recordings of multiple people, for example. In another example, a data set may include audio data that includes voice recordings of multiple people and at least one picture that includes a facial image of at least one of the multiple people.

The example method 400 may flow from block 402 to block 404 (Sending a data set including audio data including recording voices of multiple people and image data including at least one facial image of one of the multiple people), which may refer to computer device 100 sending a data set to one of user devices 110. In one embodiment, at least one facial image of one of multiple people in the stored image data may be eligible to be designated as a person to provide content including at least portions of a voice recording to be used for authentication purposes. In another embodiment, computer device 100 may send a data set including audio data that includes voice recordings of multiple people and image data including plural facial images of the multiple people without marking, and the one of user devices 110 may send data of a selection of one person in the image data to computer device 100. In another embodiment, computer device 100 may send a data set including audio data including voice recordings of multiple people and image data including one facial image of one of the multiple people. In this case, user may input content of displayed person's speaking voice as a response at one of user devices 110.

The example method 400 may flow from block 404 to block 406 (Requesting to input a response), which may refer to computer device 100 requesting to input a response to one of user devices 110. In some embodiments, computer device 100 may request to input a response including a part of the voice content of one person shown in the image data. In one embodiment, after accepting the selection of one person in the image data from one of user devices 110, computer device 100 may send a request of input of a response to one of user devices 110. In another embodiment, if computer device 100 designates a person in image data, this request may be sent at the same time of the data set. In another embodiment, if computer device 100 sends a data set including audio data including voice recordings of multiple people and image data including at least one facial image of one of the multiple people, an input request may be sent at the same time of the data set.

The example method 400 may flow from block 406 to block 408 (Receiving and replaying data set), which may refer to one of user devices 110 receiving a data set and a request to input a response, and to replay the data set for user authentication. In some embodiments, one of user devices 110 may replay a data set by displaying image data in the data set and reproducing audio data. Image data including at least one facial image of multiple people may be displayed. When the image data includes plural images of multiple people, those images that include one of the designated persons may be displayed. Audio data may include voice recordings of multiple people, and one voice recording in the audio data may correspond to a displayed person in image data. In one embodiment, when one of user devices 110 receives plural data sets from computer device 100, plural image data in the plural data sets may be displayed first for selecting one of the plural data sets, then selected one of the plural data sets may be displayed and replayed.

The example method 400 may flow from block 408 to block 410 (Request another data?), which may refer to one of user devices 110 determining whether another data is requested by user. When user wishes to change a data set for authentication, one of user devices 110 may send a request of another data set to computer device 100.

The example method 400 may flow from block 410 to block 412 (Sending a data set change request), which may refer to one of user devices 110 sending a data set change request to computer device 100 when one of user devices 110 determines that another data is requested by user (yes).

The example method 400 may flow from block 412 to block 414 (Re-generating a data set), which may refer to computer device 100 re-generating a data set for user authentication. Process in this block may be the same or similar to block 402. Computer device 100 may generate a new data set including at least one different person's voice recording and facial image.

The example method 400 may flow from block 414 to block 416 (Sending another data set), which may refer to computer device 100 sending another data set to one of user devices 110. In some embodiments, a data set may include audio data including voice recordings of multiple people and image data including a facial image of one of the multiple people. A process of generating a data set may be the same or similar to block 404. Computer device 100 may send an input request of a response to one of user devices 110 at the same time of sending the data set or after accepting a selection of one person in the image data from one of user devices 110.

The example method 400 may flow from block 416 to block 418 (Receiving and replaying another data set), which may refer to one of user devices 110 receiving another data set from computer device 100 and replaying it. In some embodiments, one of user devices 110 may receive another data set including audio data and image data. Replaying another data set may be performed by displaying image data and reproducing audio data at one of user devices 110. User may hear reproduced audio data including voice recordings of multiple people and watch displayed image data.

The example method 400 may flow from block 418 to block 420 (Inputting and sending a response), which may refer to one of user devices 110 accepting an input of a response from an input unit, and sending the response to computer device 100. Examples of the input unit may include a keyboard and a microphone. Furthermore, the example method 400 may flow block 410 to block 420 (Inputting and sending a response), which may refer to one of user devices 110 determining that other data is not requested by user (no). When user distinguishes a voice recording of a designated, selected, or displayed person, user may input at least a part of content of the voice recording as a response. User is possible to distinguish one person's voice from voice recordings of multiple people when he pays selective attention on a specific person, especially acquaintances (cocktail-party effect). A response may be text data, for example. In another example, a response may be audio data by inputting from an audio input.

The example method 400 may flow from block 420 to block 422 (Receiving response from user device), which may refer to computer device 100 receiving a response to a data set from one of user devices 110. In some embodiments, a response may include data that indicates content of designated, selected, or displayed person's speaking voice in a data set.

The example method 400 may flow from block 422 to block 424 (Retrieving speaking voice content), which may refer to computer device 100 retrieving speaking voice content corresponding to a designated, selected, or displayed person in image data from database 232 in storage 230. In one embodiment, database 232 may store speaking voice content corresponding to audio data and image data of the same person. Computer device 100 may access database 232 to determine whether the response corresponds to at least a part of content of a voice recording of one of multiple people whose facial image is included in image data.

The example method 400 may flow from block 424 to block 426 (Comparing the response with retrieved content), which may refer to computer device 100 comparing a received response from one of user devices 110 with retrieved content. The retrieved content may have full correct content of speaking voice of a designated, selected, or displayed person for authentication so that computer device 100 may compare the received response with the retrieved content.

The example method 400 may flow from block 426 to block 428 (Determining whether the response corresponds to a part of the retrieved content), which may refer to computer device 100 determining whether the response corresponds to at least a part of the retrieved content from database 232. In some embodiments, computer device 100 may determine whether one of user devices 110 should be authenticated based on the response. In one embodiment, computer device 100 may determine for authentication whether the response corresponds to the retrieved content. In another embodiment, computer device 100 may authenticate one of user devices 110 if the response from the one of user devices 110 corresponds to a part of the retrieved content. When computer device 100 determines the response from one of user devices 110 corresponds to at least of a part of the retrieved content, the one of user devices 110 may allow to access an online service, confidential information, or personal information, for example. When computer device 100 determines the response from one of user devices 110 does not correspond to any part or enough part of the retrieved content, the one of user devices 110 may be denied accessing an online service, confidential information or personal information, for example.

Figure 5A:
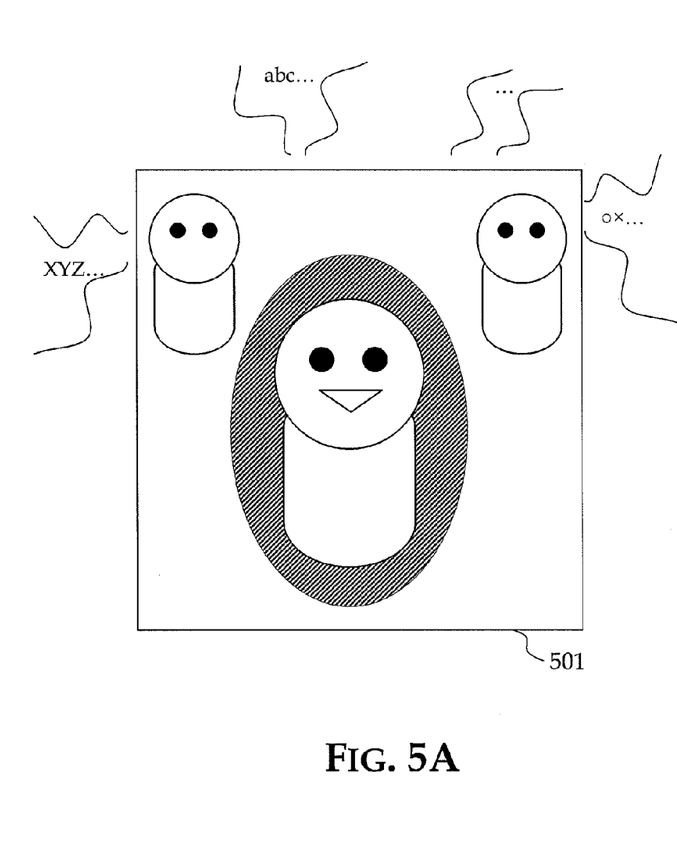
FIG. 5A is an illustrative example of displaying and reproducing a provided data set at an example user device.

FIG. 5A is an illustrative example of displaying and reproducing a generated data set at an example user device that is configured in accordance with at least some embodiments of the present disclosure. One of user devices 110 may receive a data set including audio data including voice recordings of multiple people and image data including at least a facial image of at least one of the multiple people. An example of displayed and reproduced data set 501 may include voice recordings of multiple people and images of multiple people, and one of the images of the multiple people is marked. When the data set is replayed at one of user devices 110, audio data may be sent to a speaker of the one of user devices 110, and image data may be displayed on a display of the one of user devices 110. In one embodiment, one person in the image data may be marked by changing color at the area of the person. In another embodiment, the guidance message (e.g. "please input content of speaking voice of marked person") may be also displayed at the user device. The marked person may be selected by a user or designated by an authentication device (computer device 100) for authenticating one of user device 110. In one embodiment, user may input content of speaking voice corresponding to displayed selected or designated person.

Figure 5B:
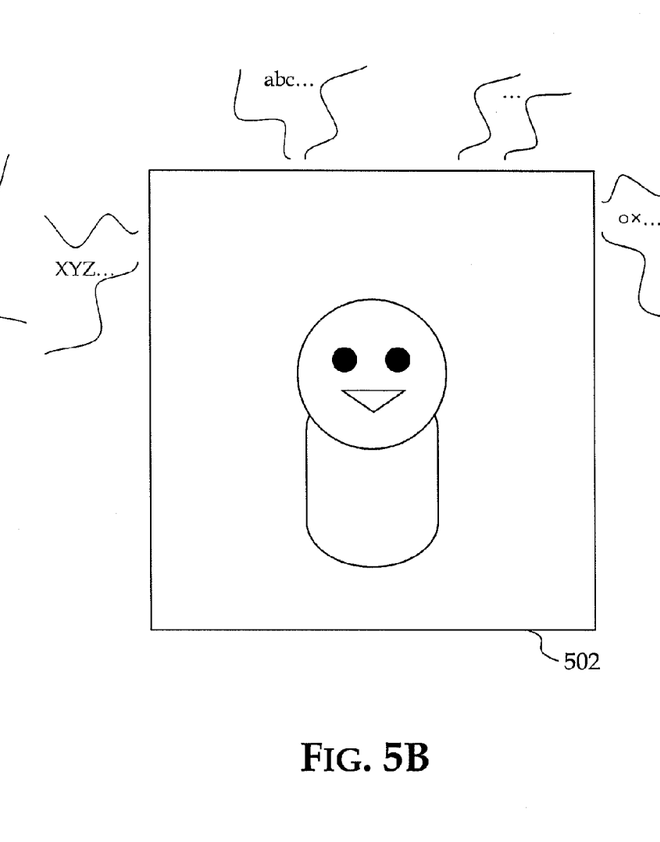
FIG. 5B is another illustrative example of displaying and reproducing a provided data set at an example user device.

FIG. 5B is another illustrative example of displaying and reproducing a generated data set at an example user device that is configured in accordance with at least some embodiments of the present disclosure. In some embodiments, one of user devices 110 may receive a data set including audio data including voice recordings of multiple people and image data including at least a facial image of one person of the multiple people. An example of displayed and reproduced data set 502 may include voice recordings of multiple people and an image of one person of the multiple people. When the data set is replayed at one of user devices 110, one person in the image data may be displayed and audio data including speaking voices of multiple people may be reproduced. In one embodiment, user may input content of a speaking voice corresponding to displayed person for user authentication.

Figure 6:
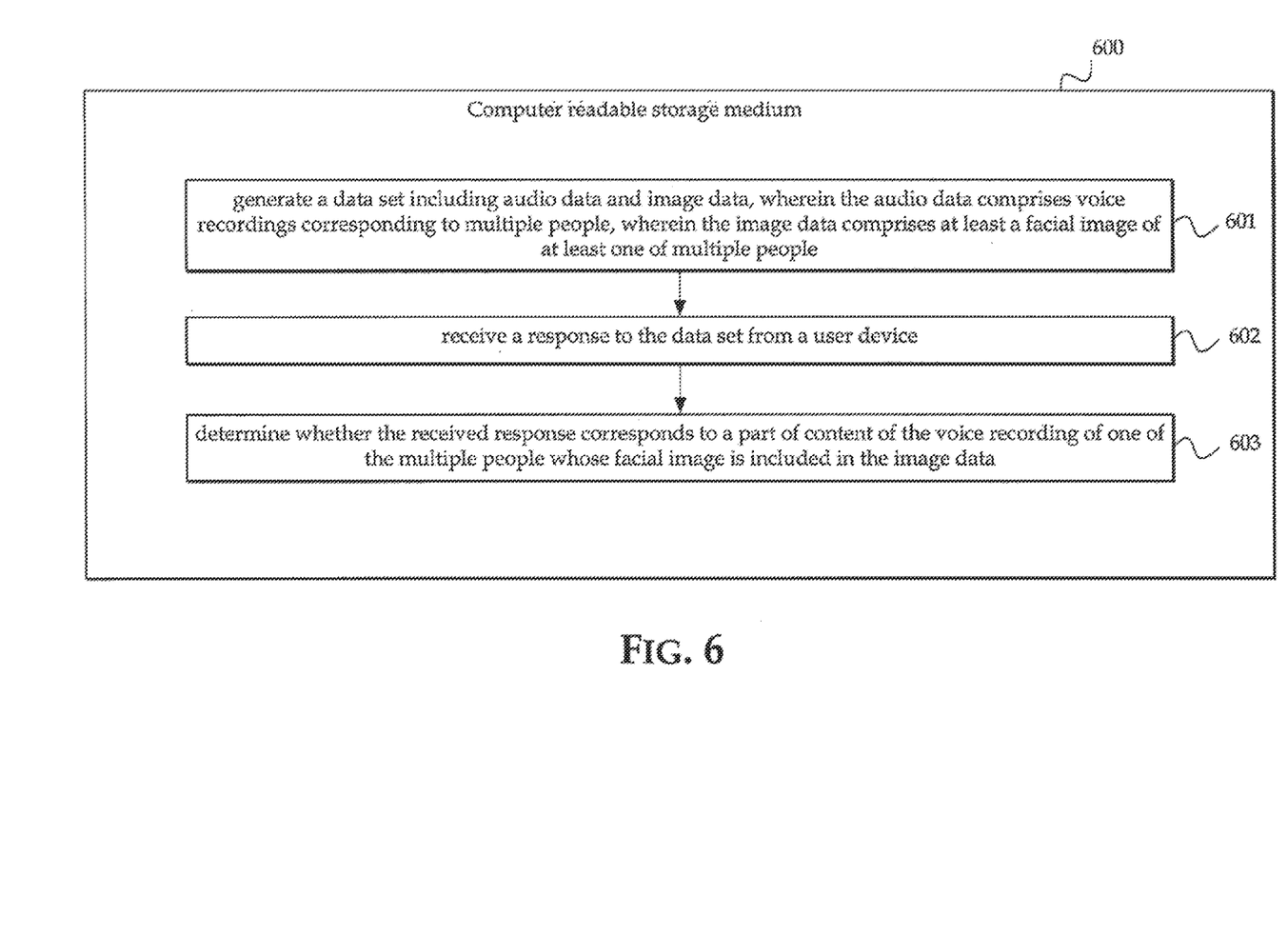
FIG. 6 is a schematic diagram of an example computer readable storage medium including contents.

FIG. 6 is a schematic diagram of an example computer readable storage medium 600 including contents that is configured in accordance with at least some embodiments of the present disclosure. When executed by a computer, contents of the computer readable storage medium may cause the computer to generate a data set including audio data and image data, wherein the audio data comprises voice recordings corresponding to multiple people, wherein the image data comprises at least a facial image of at least one of multiple people (operation 601); receive a response to the data set from a user device (operation 602); and determine whether the received response corresponds to a part of content of the voice recording of one of the multiple people whose facial image is included in the image data (operation 603).

Figure 7:
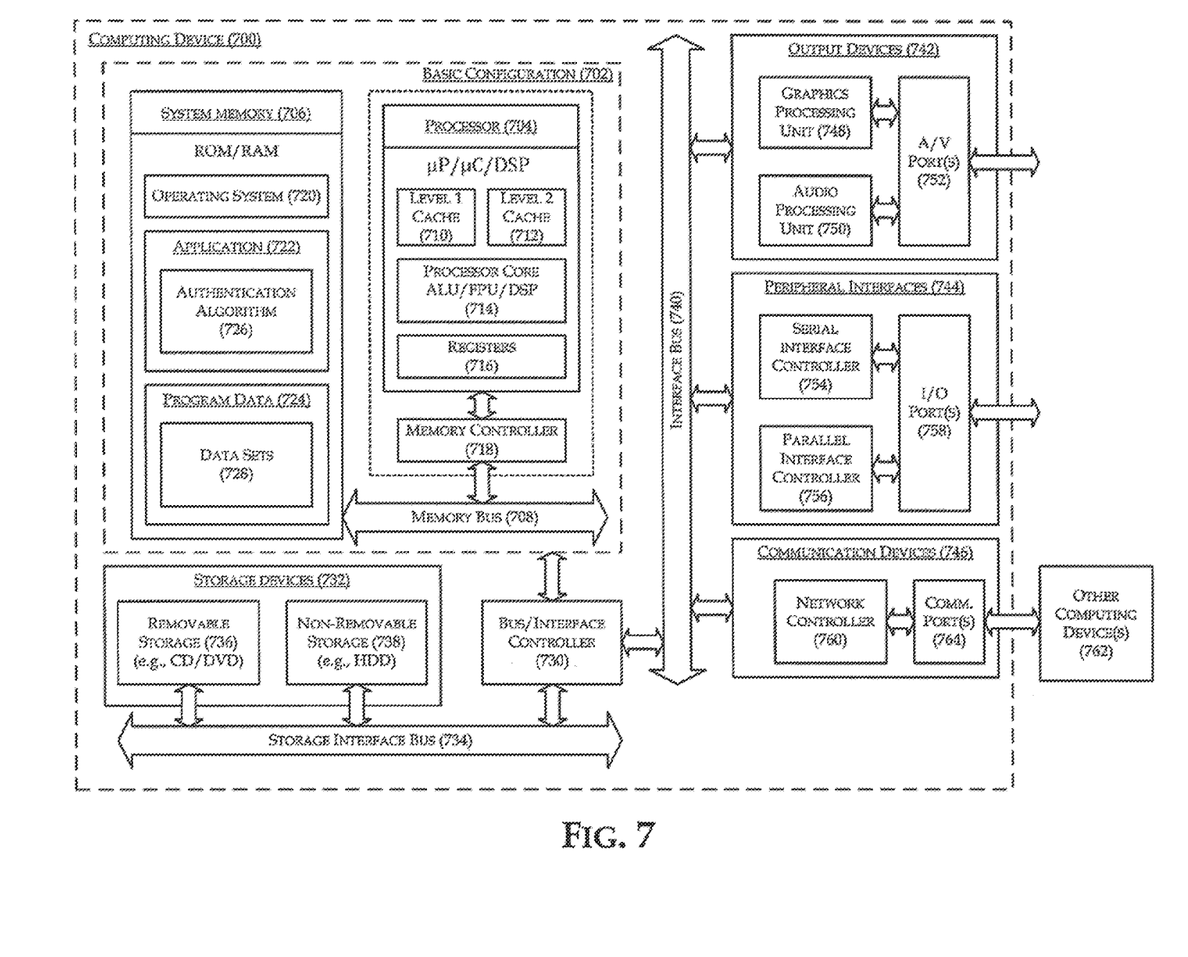
FIG. 7 is a block diagram illustrating an example computing device that may be configured to authenticate user, all arranged in accordance with at least some embodiments of the present disclosure all in accordance with various embodiments described herein.

FIG. 7 is a block diagram illustrating an example computing device 700 that is configured for user authentication in accordance with the present disclosure. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include an authentication algorithm 726 that is configured to perform the functions as described herein including the functional blocks and/or actions described with respect to process 300 of FIG. 3 and/or process 400 of FIG. 4. Program data 724 may include data sets 728 that may be useful for authenticating user as is described herein. In some embodiments, application 722 may be configured to operate with program data 724 on operating system 720 such that implementations of user authentication may be provided as described herein. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be configured to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a computer device, the method comprising:
    generating a request for user authentication, wherein the generated request comprises a plurality of data sets, wherein each of the plurality of data sets is generated by combining audio data and image data, wherein the audio data comprises voice recordings corresponding to multiple people, and wherein the image data comprises at least a facial image of at least one of the multiple people;
    responsive to the generated request, receiving a response to a data set from a user device, wherein the data set being selected from the plurality of data sets by the user device; and
    authenticating the user device in response to determining that the received response corresponds to at least a part of content of a voice recording of the at least one of the multiple people whose facial image is included in the image data of the data set.

2. The method of claim 1, wherein the image data further comprises at least one picture.

3. The method of claim 1, wherein the data set comprises at least one speaking video.

4. The method of claim 1, wherein the image data further comprises images corresponding to the multiple people, and wherein an image corresponding to one person in the image data is designated.

5. The method of claim 4, wherein the determining further comprises determining that the received response corresponds to at least a part of content of a voice recording of the one person whose image is designated in the image data.

6. The method of claim 1, wherein the image data comprises images of the multiple people, and the method further comprising:
    accepting a selection of one person whose image is included in the image data from the user device.

7. The method of claim 6, wherein the determining further comprises determining that the received response corresponds to at least a part of content of a voice recording of the selected person in the image data.

8. The method of claim 1, wherein the received response comprises text data.

9. The method of claim 5, wherein determining that the received response corresponds to the at least a part of content of the voice recording of the one person whose image is designated in the image data further comprises:
    retrieving content of the voice recording corresponding to the one person whose image is designated in the image data;
    comparing the received response with the retrieved content; and
    determining whether the received response corresponds with at least a part of the retrieved content.

10. The method of claim 1, further comprising:
    requesting to input a response that includes at least a part of content of a voice recording of one person whose image is included in the image data.

11. The method of claim 1, further comprising:
    generating another data set when a data set change is requested by the user device.

12. The method of claim 1, wherein the audio data includes monaural.

13. A computer device, comprising:
    at least one processor, and memory coupled to the at least one processor, wherein the
    at least one processor is configured to:
        generate a request for user authentication, the generated request comprising a plurality of data sets, wherein each of the plurality of data sets is generated by combination of audio data and image data, wherein the audio data comprises voice recordings corresponding to multiple people, and wherein the image data comprises at least a facial image of at least one of the multiple people;
        receive, responsive to the generated request, a response to a data set from a user device, wherein the data set being selected from the plurality of data sets by the user device; and
        authenticate the user device in response to determination that the received response corresponds to at least a part of content of a voice recording of the at least one of the multiple people whose facial image is included in the image data of the data set.

14. The computer device of claim 13, wherein the at least one processor is further configured to designate an image corresponding to one person among images corresponding to the multiple people in the image data.

15. The computer device of claim 13, wherein the at least one processor is further configured to accept a selection of one person whose image is included in the image data from the user device.

16. The computer device of claim 13, wherein the at least one processor is further configured to generate the plurality of data sets through obtaining the audio data and the image data from a database.

17. The computer device of claim 14, wherein the at least one processor is further configured to retrieve content of the voice recording corresponding to the one person whose image is designated in the image data, compare the received response with the retrieved content, and determine whether the received response corresponds to at least a part of the retrieved content.

18. The computer device of claim 13, wherein the at least one processor is further configured to request to input a response including at least a part of content of a voice recording of one person whose image is included in the image data.

19. The computer device of claim 13, wherein the at least one processor is further configured to generate another data set when a data set change is requested by the user device.

20. A non-transitory computer readable storage medium whose content, when executed by a computer device, cause the computer device to:
    generate a request for user authentication, the generated request comprising a plurality of data sets, wherein each of the plurality of data sets is generated by combination of audio data and image data, wherein the audio data comprises voice recordings corresponding to multiple people, and wherein the image data comprises at least a facial image of at least one of the multiple people;

responsive to the generated request, receive a response to a data set from a user device, wherein the data set being selected from the plurality of data sets by the user device; and authenticate the user device in response to determination that the received response corresponds to at least a part of content of a voice recording of the at least one of the multiple people whose facial image is included in the image data of the data set.

21. The non-transitory computer readable storage medium of claim 20, wherein the content further cause the computer device to:

request to input a response that includes at least a part of content of a voice recording of one person whose image is included in the image data.

22. The non-transitory computer readable storage medium of claim 20, wherein the content further cause the computer device to:

generate another data set when a data set change is requested by the user device.

* * * * *